April 1, 1958   J. SCHMID   2,828,764
FLOW CONTROL DEVICE
Filed Dec. 18, 1953

INVENTOR:
JOSEF SCHMID
BY:

United States Patent Office 2,828,764
Patented Apr. 1, 1958

2,828,764

FLOW CONTROL DEVICE

Josef Schmid, Ludwigsburg, Germany, assignor to Firma Junkers & Co. G. m. b. H., Wernau (Neckar), Germany Application December 18, 1953, Serial No. 398,908

Claims priority, application Germany December 20, 1952

6 Claims. (Cl. 137—504)

The present invention relates to flow control devices. More particularly, the present invention relates to a flow control device particularly adapted for controlling the flow of a gaseous medium and utilizing a movable control member which is responsive to the pressure of the gaseous medium for controlling the flow thereof.

The known flow control devices of the above type, the movable flow control member due to its arrangement in the gas conduit does not quickly reach its rest position and is swingable or otherwise movable back and forth due to pressure changes of the flowing medium, with the result that with every change in pressure of the gas in the conduit inlet, corresponding pressure changes occur in the conduit outlet, until the movable control member reaches its rest position. Since each rest position of the movable control member in such prior known arrangements is disturbed by even small pressure changes of short duration, there is caused, in the operation of such arrangements, relatively frequent disturbing pressure changes in the conduit outlet.

It is, therefore, an object of the present invention to provide a flow control device which overcomes the above mentioned disadvantages.

It is another object of the present invention to provide a flow control device which effectively and automatically controls the flow of a gaseous medium through a conduit.

It is still another object of the present invention to provide a flow control device of the above type wherein the movements of the movable flow control member are effectively damped to avoid disturbing pressure changes.

Other objects and advantages will become apparent from the following description and the appended claims.

With the above objects in view, the present invention mainly consists, in combination, in a flow control device, of a tubular guide member formed with openings in its side wall nearer one end thereof, and a flow control member arranged within the tubular guide member and being formed with an opening for passage of fluid medium therethrough, the flow control member being axially movable within the tubular guide member by increased pressure of the fluid medium against the flow control member toward one end of the tubular guide member to a position at least partially covering the openings in the tubular guide member for reducing the flow of the fluid medium therethrough and movable by reduced pressure of the fluid medium toward the other end of the tubular guide member for uncovering the openings for increasing the flow of fluid medium therethrough, the movable flow control member having an annular guide portion extending around the periphery thereof projecting toward the inner surface of the tubular guide member for guiding the movable flow control member in axial movement along the tubular guide member and arranged so as to provide a slight clearance between the annular guide portion of the movable flow control member and the inner surface of the tubular guide member, the slight clearance producing a damping effect on the movements of the movable flow control member in said tubular guide member by the flow friction in the clearance.

The novel features which are considered as characteristic for the invention are set forth in particular in the appended claims. The invention itself, however, both as to its construciton and its method of operation, together with additional objects and advantages thereof, will be best understood from the following description of specific embodiments when read in connection with the accompanying drawings, in which:

Figure 1:
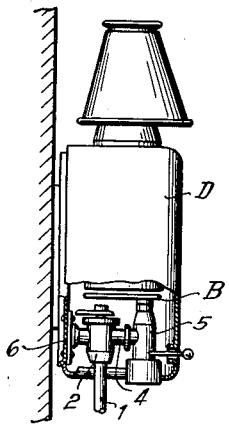
Fig. 1 is a side view of a gas water heater adapted to be equipped with a flow control device of the present invention.
Figure 3:
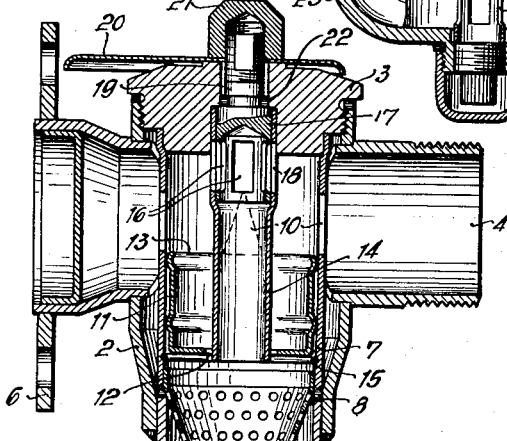
Fig. 3 is a longitudinal section of a flow control device incorporated in the arrangement shown in Fig. 1.

Referring now to the drawings, and particularly to Figs. 1 and 3, there is shown one embodiment of the present invention wherein a tubular section 2 is arranged in fluid tight connection with the upper end of the gas inlet tube 1. At the joint between tubes 1 and 2 the tubes are tightly welded or soldered together. Tubular section 2 forms a housing for receiving the flow control device of the present invention, and at the upper end of tube section 2 a screw cap 3 is provided closing the open end of tube section 2. An outlet pipe 4 branches laterally off from tubular section 2 and is removably connected to the gas conduit of fitting 5 of the continuous heater device D.

Opposite the connecting pipe 4 the tubular section 2 carries a short closed pipe having a flange 6 which is adapted to be mounted on mounting frame (not shown) or on the wall to which the device is to be attached.

A tubular insert member 7 secured to the screw cap 3 extends into the tube section 2 with clearance therebetween, the lower end of insert member 7 being arranged to press with its lower end against sealing ring 8 which lies on the upper edge of gas inlet tube 1. At the lower end of insert member 7 a conical screen 9 is arranged with the base thereof inserted within the open end of insert member 7 and removably fastened thereto by resiliently pressing against the inner surface of insert member 7. The apex of screen 9 extends into gas inlet tube 1, and by virtue of the arrangement as shown in Fig. 3 the base portion of screen 9 serves to center sealing ring 8 in position between the opposing edges of insert member 7 and gas inlet tube 1.

Approximately at the height of the axis of outlet pipe 4, insert member 7 is provided with four triangular apertures 10 which are spaced at about 90° relative to each other. A piston- or cup-shaped floating control member 11 is slidably arranged within insert member 7, the bottom of floating member 11 being formed with a relatively large opening 12. Floating member 11 is slidable along the axis of insert member 7 so that, depending upon the height to which the upper edge 13 of member 11 extends in the various axial positions of member 11, member 11 closes openings 10 of insert member 7 to a greater or a lesser amount. A mounting ring 15, which may be a spring ring, is arranged in an annular groove at the lower end of insert member 7 and serves to keep floating member 11 from falling out of insert member 7.

In addition to carrying insert member 7, screw cap 3 also carries an inner tubular member 14 which extends coaxially with insert member 7 and projects with its open lower end through opening 12 in floating member 11, there being clearance provided between inner tubular member 14 and floating member 11 at the opening 12, as shown in Fig. 3. In the vicinity of its upper end, inner tubular member 14 is formed with apertures 18 through which the inlet pipe 1 may communicate with outlet pipe 4. An annular hollow slide valve 17 is rotatably mounted in inner tubular member 14 adjacent the apertures 18 therein, the annular slide valve 17 being formed with openings 16 similar to the apertures 18. By turning the valve 17 the openings 16 and 18 can be brought into positions wherein the openings are covered to a greater or lesser degree. The openings 16 and 18 are so dimentioned and arranged that their largest passage cross section is at least equal to the inner passage cross section of tubular member 14. The valve member 17 is connected to a pin 19 turnably mounted in screw cover 3 which extends outwardly of the screw cap 3 and is equipped at its outwardly projecting end with a hand lever 20. A cap nut 21 is provided for screwing hand lever 20 onto screw cap 3 and simultaneously to secure the pin 19 in screw cap 3.

The turnable pin 19 is provided with an annular groove in which a sealing ring 22 of rubber or the like is arranged, which provides a packing between pin 19 and the aperture in the screw cap 3, and at the same time prevents unintended turning of the valve member 17.

The above described flow control device operates as follows:

As soon as the gas inlet to burner B of water heater D is opened, gas may flow from inlet pipe 1 through the triangular openings 10 in insert member 7 into the outlet pipe 4 and from there through the fitting 5 to burner B in the following two ways:

Firstly, through tubular member 14 and the openings 16 and 18. The gas volume flowing therethrough may be adjusted as desired by the adjustment of valve member 17.

Secondly, through the annular clearance space between tubular member 14 and the rim of opening 12 in the bottom of floating control member 11. This volume of gas is unchangeable.

Since in this way flowing gas strikes against the bottom of floating control member 11, the member 11 is raised upwardly from its resting position to a greater or lesser degree. Consequently, the shell of control member 11 covers the triangular openings 10 to a greater or lesser extent, and in this way, when the gas pressure in the inlet portion 1 varies, the pressure of the gas which flows out through the uncovered portions of apertures 10, and thereby the quantity of gas delivered to the burner per unit of time, remains approximately the same.

Figure 2:
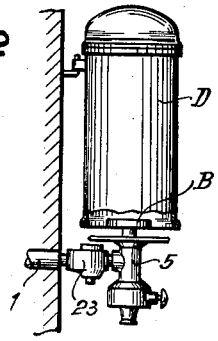
Fig. 2 is a side view of a different type of gas water heater adapted to be equipped with a different embodiment of the present flow control device.
Figure 4:
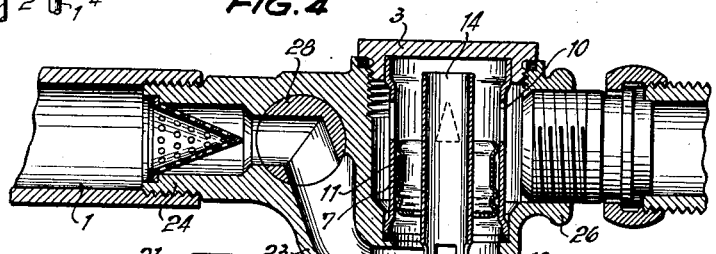
Fig. 4 is a longitudinal section through a flow control device incorporated in the arrangement shown in Fig. 2.

In the embodiment shown in Figs. 2 and 4, the parts of the device corresponding to the parts of the previously described embodiment are indicated with the same reference numerals. This embodiment differs from the embodiment shown in Fig. 3 essentially in that the flow control device is not arranged in the gas conduit tube, but is arranged in a separate cast-metal housing 23 which is connected by means of connecting pipe 24 to the gas inlet pipe 1, and by means of connecting pipe 26 with the fitting 5 of the water heater D. The connecting pipe 24 is equipped with a gas valve 28.

A further difference between the embodiments is that the central tubular member 14 in the embodiment of Fig. 4 is not fastened to screw cap 3, but is connected to a threaded pin 29 which is threadedly mounted in the bottom of housing 23.

Openings 18 in inner tube member 14 are arranged in the tube 14 nearer the gas inlet side thereof in the vicinity of the inner end of threaded pin 29. The upper open end of tube member 14 may be moved toward and away from the bottom of screw cap 3 by appropriate turning of threaded pin 29, whereby the gas quantity which flows through tube 14 to the triangular openings 10 can be varied as desired. This variation of the flow quantity serves in known manner for adjustment of the desired burner pressure. The outer end of threaded end 29 is covered by means of a removable closure cap 30.

Figure 5:
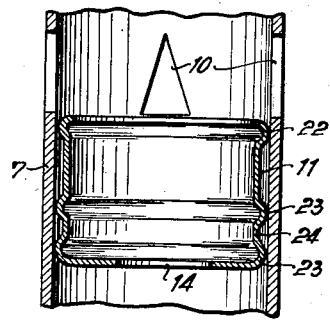
Fig. 5 is a longitudinal section through a floating control member adapted to be used in the embodiments shown in Figs. 3 and 4.

Fig. 5 shows an embodiment wherein a particular form of floating member 11 is provided, and in this form member 11 has at its upper edge a raised bead-like guiding ring 22 which serves only as a lateral guide for the floating member 11, the diameter thereof being somewhat smaller than the guide bore formed by the tubular insert member 7. At the lower section of the floating member 11 there are provided two spaced, raised bead-like guide rings 23, between which the hollow annular chamber 24 is defined.

Figure 6:
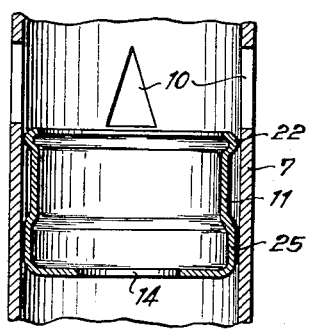
Fig. 6 is a longitudinal section of another embodiment of the floating control member.

Fig. 6 shows another embodiment of the floating member 11 in which the lower portion of the floating member 11 is formed with a raised annular collar 25. The guide rings 23 as well as the annular collar surface 25 are arranged to provide such a slight clearance between themselves and the guide wall of insert member 7 that a flow friction is produced in the narrow guide clearance space during the axial movement of the floating member 11 in insert member 7, the thus-produced flow friction serving to damp the movements of the floating member. The arrangement of the device is such that the lower section of floating member 11 having the guide rings 23 or the annular collar 25 lies below the lowermost edges of openings 10 even in the uppermost operating position of floating member 11.

As pointed out above, a flow friction is produced by the shifting of the floating member 11 in the narrow clearance between the guide rings 23 or the annular collar 25 and the opposite guide surface of insert member 7, which flow friction damps the shifting movements of the floating member 11. For the purposes of the invention it is important that the floating member 11 have at its lower section, i. e. on that portion of its outer surface which lies in every operational position below the lowermost edge of the openings 10 at least a narrow clearance.

With respect to the embodiment shown in Fig. 5, it is of advantage if the guide rings 23 have opposite the guide wall of insert member 7 a bead-like outer surface or a knife-like edge. In this way, the suspended particles carried along the flowing gas which become deposited in the narrow annular clearance space are easily removed by the shifting movements of the floating member 11 within the insert member 7, so that no disturbing mechanical friction can occur. The annular space 24 between guide rings 25 aids in producing the desired movement-damping effect, since in this annular space the laminar flow is transformed at least partly into a turbulent flow.

In the embodiments of the particular floating member 11 shown and described, the cup-shaped floating member may be formed by pressing it out of a thin drawn sheet, the guide rings 22, 23 and 25 being pressed out of the sheet. The floating member can, however, be made, for example, from a turning or a casting, and also out of other suitable materials, such as molded plastics or the like.

It will be understood that each of the elements described above, or two or more together, may also find a useful application in other types of flow control devices differing from the types described above.

While the invention has been illustrated and described as embodied in a flow control device for gas water heaters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. In a flow control device, in combination, a tubular guide member formed with openings in its side wall and having a substantially vertical operating position; and a hollow piston-shaped flow control float member arranged within said tubular guide member and having a wall substantially normal to the axis of said guide member formed with an opening for passage of fluid medium therethrough, said flow control member being axially movable within said tubular guide member by the difference between pressures of the fluid medium acting respectively against opposite faces of said wall toward one end of said tubular guide member to a position at least partially covering said openings in said tubular guide member for reducing the flow of fluid medium therethrough and toward the other end of said tubular guide member for uncovering said openings for increasing the flow of fluid medium therethrough, said movable flow control member being biased downwardly by its own weight and having in a part thereof remote from said openings in said tubular guide member which does not reach said openings during the axial movements of said flow control member a plurality of annular guide portions extending around the periphery thereof projecting toward the inner surface of said tubular guide member for guiding said movable flow control member in axial movement along said tubular guide member and arranged so as to provide a slight clearance between said annular guide portion of said movable flow control member of the inner surface of said tubular guide member, said slight clearance producing a damping effect on the movements of said movable flow control member in said tubular guide member by the flow friction in said clearance.

2. In a flow control device, in combination, a tubular guide member formed with openings in its side wall and having a substantially vertical operating position; and a hollow piston-shaped flow control float member arranged within said tubular guide member and having a wall substantially normal to the axis of said guide member formed with an opening for passage of fluid medium therethrough, said flow control member being axially movable within said tubular guide member by the difference between pressures of the fluid medium acting respectively against opposite faces of said wall toward one end of said tubular guide member to a position at least partially covering said openings in said tubular guide member for reducing the flow of the fluid medium therethrough and toward the other end of said tubular guide member for uncovering said openings for increasing the flow of fluid medium therethrough, said movable flow control member being biased downwardly by its own weight and having in a part thereof remote from said openings in said tubular guide member which does not reach said openings during the axial movements of said flow control member at least two axially spaced annular guide portions defining with said tubular guide member an annular chamber therebetween and extending around the periphery thereof projecting toward the inner surface of said tubular guide member for guiding said movable flow control member in axial movement along said tubular guide member and arranged so as to provide a slight clearance between said annular guide portion of said movable flow control member and the inner surface of said tubular guide member, said slight clearance producing a damping effect on the movements of said movable flow control member in said tubular guide member by the flow friction in said clearance.

3. In a flow control device, in combination, a tubular guide member formed with openings in its side wall and having a substantially vertical operating position; and a cup-shaped flow control float member arranged within said tubular guide member and having a bottom wall formed with an opening for passage of fluid medium therethrough, said flow control member being axially movable within said tubular guide member by the difference between pressures of the fluid medium acting respectively against opposite faces of said wall toward one end of said tubular guide member to a position at least partially covering said openings in said tubular guide member for reducing the flow of the fluid medium therethrough and toward the other end of said tubular guide member for uncovering said openings for increasing the flow of fluid medium therethrough, said movable flow control member being biased downwardly by its own weight and having in a part thereof remote from said openings in said tubular guide member which does not reach said openings during the axial movements of said flow control member a plurality of annular raised guide portions extending around the periphery thereof projecting toward the inner surface of said tubular guide member for guiding said movable flow control member in axial movement along said tubular guide member and arranged so as to provide a slight clearance between said annular guide portion of said movable flow control member and the inner surface of said tubular guide member, said slight clearance producing a damping effect on the movements of said movable flow control member in said tubular guide member by the flow friction in said clearance.

4. In a flow control device, in combination, a tubular guide member formed with openings in its side wall and having a substantially vertical operating position; and a cup-shaped flow control float member arranged within said tubular guide member and having a bottom wall formed with an opening for passage of fluid medium therethrough, said flow control member being axially movable within said tubular guide member by the difference between pressures of the fluid medium acting respectively against opposite faces of said wall toward one end of said tubular guide member to a position at least partially covering said openings in said tubular guide member for reducing the flow of therethrough and pressure of said fluid medium toward the other end of said tubular guide member for uncovering said openings for increasing the flow of fluid medium therethrough, said movable flow control member being biased downwardly by its own weight and having in a part thereof remote from said openings in said tubular guide member which does not reach said openings during the axial movements of said flow control member at least two axially spaced annular raised guide portions defining with said tubular guide member an annular chamber therebetween and extending around the periphery thereof projecting toward the inner surface of said tubular guide member for guiding said movable flow control member in axial movement along said tubular guide member and arranged so as to provide a slight clearance between said annular guide portion of said movable flow control member and the inner surface of said tubular guide member, said slight clearance producing a damping effect on the movements of said movable flow control member in said tubular guide member by the flow friction in said clearance.

5. In a flow control device, in combination, a tubular guide member formed with openings in its side wall and having a substantially vertical operating position; and a cup-shaped flow control float member arranged within said tubular guide member and having a bottom wall formed with an opening for passage of fluid medium therethrough, said flow control member being axially movable within said tubular guide member by the difference between pressures of the fluid medium acting respectively against opposite faces of said wall toward one end of said tubular guide member to a position at least partially covering said openings in said tubular guide member for reducing the flow of the fluid medium therethrough and toward the other end of said tubular guide member for uncovering said openings for increasing the flow of fluid medium therethrough, said movable flow control member being biased downwardly by its own weight and having in a part thereof remote from said openings in said tubular guide member which does not reach said openings during the axial movements of said flow control member a plurality of annular raised bead-like guide portions extending around the periphery thereof projecting toward the inner surface of said tubular guide member for guiding said movable flow control member in axial movement along said tubular guide member and arranged to as to provide a slight clearance between said annular guide portion of said movable flow control member and the inner surface of said tubular guide member, said slight clearance producing a damping effect on the movements of said movable flow control member in said tubular guide member by the flow friction in said clearance.

6. In a flow control device, in combination, a tubular guide member formed with openings in its side wall and having a substantially vertical operating position; and a hollow piston-shaped flow control member formed of drawn sheet metal arranged within said tubular guide member and having a wall substantially normal to the axis of said guide member formed with an opening for passage of fluid medium therethrough, said flow control member being axially movable within said tubular guide member by the difference between pressures of the fluid medium acting respectively against opposite faces of said wall toward one end of said tubular guide member to a position at least partially covering said openings in said tubular guide member for reducing the flow of the fluid medium therethrough and toward the other end of said tubular guide member for uncovering said openings for increasing the flow of fluid medium therethrough, said movable flow control member being biased downwardly by its own weight and having as a portion of a wall thereof in a part thereof remote from said openings in said tubular guide member which does not reach said openings during the axial movements of said flow control member at least two axially spaced annular guide portions of substantially U-shaped cross section defining with said tubular guide member an annular chamber therebetween and extending around the periphery thereof projecting toward the inner surface of said tubular guide member for guiding said movable flow control member in axial movement along said tubular guide member and arranged so as to provide a slight clearance between said annular guide portion of said movable flow control member and the inner surface of said tubular guide member, said slight clearance producing a damping effect on the movements of said movable flow control member in said tubular guide member by the flow friction in said clearance.

References Cited in the file of this patent

UNITED STATES PATENTS

| | | |
|---|---|---|
| 504,507 | Webb | Sept. 5, 1893 |
| 852,425 | Ellis | May 7, 1907 |
| 2,198,487 | Sisk | Apr. 23, 1940 |